United States Patent
Middleton et al.

(10) Patent No.: US 10,114,545 B2
(45) Date of Patent: Oct. 30, 2018

(54) IMAGE LOCATION SELECTION FOR USE IN DEPTH PHOTOGRAPHY SYSTEM

(71) Applicant: INTEL CORPORATION, Santa Clara, CA (US)

(72) Inventors: Daniel C. Middleton, Orono, MN (US); Roger Jellicoe, San Mateo, CA (US); Peter W. Winer, Los Altos, CA (US); James Granger, Larkspur, CA (US)

(73) Assignee: INTEL CORPORATION, Santa Clara, CA (US)

( * ) Notice: Subject to any disclaimer, the term of this patent is extended or adjusted under 35 U.S.C. 154(b) by 262 days.

(21) Appl. No.: 14/577,703

(22) Filed: Dec. 19, 2014

(65) Prior Publication Data

US 2016/0063714 A1    Mar. 3, 2016

Related U.S. Application Data

(60) Provisional application No. 62/045,361, filed on Sep. 3, 2014.

(51) Int. Cl.
| | |
|---|---|
| *G06F 3/0488* | (2013.01) |
| *G06F 3/0484* | (2013.01) |
| *G06T 7/11* | (2017.01) |
| *G06T 7/62* | (2017.01) |
| *G06T 7/194* | (2017.01) |
| *G06K 9/00* | (2006.01) |

(52) U.S. Cl.
CPC ...... *G06F 3/04883* (2013.01); *G06F 3/04845* (2013.01); *G06K 9/00671* (2013.01); *G06T 7/11* (2017.01); *G06T 7/194* (2017.01); *G06T 7/62* (2017.01); *G06T 2207/10012* (2013.01); *G06T 2207/20101* (2013.01)

(58) Field of Classification Search
None
See application file for complete search history.

(56) References Cited

U.S. PATENT DOCUMENTS

| | | | |
|---|---|---|---|
| 2008/0228061 A1* | 9/2008 | Habets | G06T 7/62 |
| | | | 600/407 |
| 2010/0295797 A1* | 11/2010 | Nicholson | G06F 1/1626 |
| | | | 345/173 |

(Continued)

FOREIGN PATENT DOCUMENTS

| | | |
|---|---|---|
| KR | 10-2010/0081432 | 7/2010 |
| WO | WO-2012-136901 | 10/2012 |

OTHER PUBLICATIONS

PCT/US2015/046335, "Notification of Transmittal of the International Search Report and the Written Opinion of the International Searching Authority, or the Declaration" dated Dec. 24, 2015, pp. 14.

*Primary Examiner* — Vikkram Bali
(74) *Attorney, Agent, or Firm* — Womble Bond Dickinson (US) LLP

(57) ABSTRACT

Image location selection is described for use in a depth photography system. In one example, a method includes receiving a selection from a user of a position in a captured image, comparing the selected position to objects in the image, selecting whether the selected position is intended to be within an object or outside an object, refining the position based on the selection, and determining a depth for an object corresponding to the refined position.

19 Claims, 16 Drawing Sheets

(56) References Cited

U.S. PATENT DOCUMENTS

2011/0149041 A1* 6/2011 Eccles .................. H04N 13/004
                                                             348/46
2012/0224052 A1   9/2012 Bae
2013/0181924 A1   7/2013 Hong et al.
2013/0201210 A1   8/2013 Vaddadi et al.

* cited by examiner

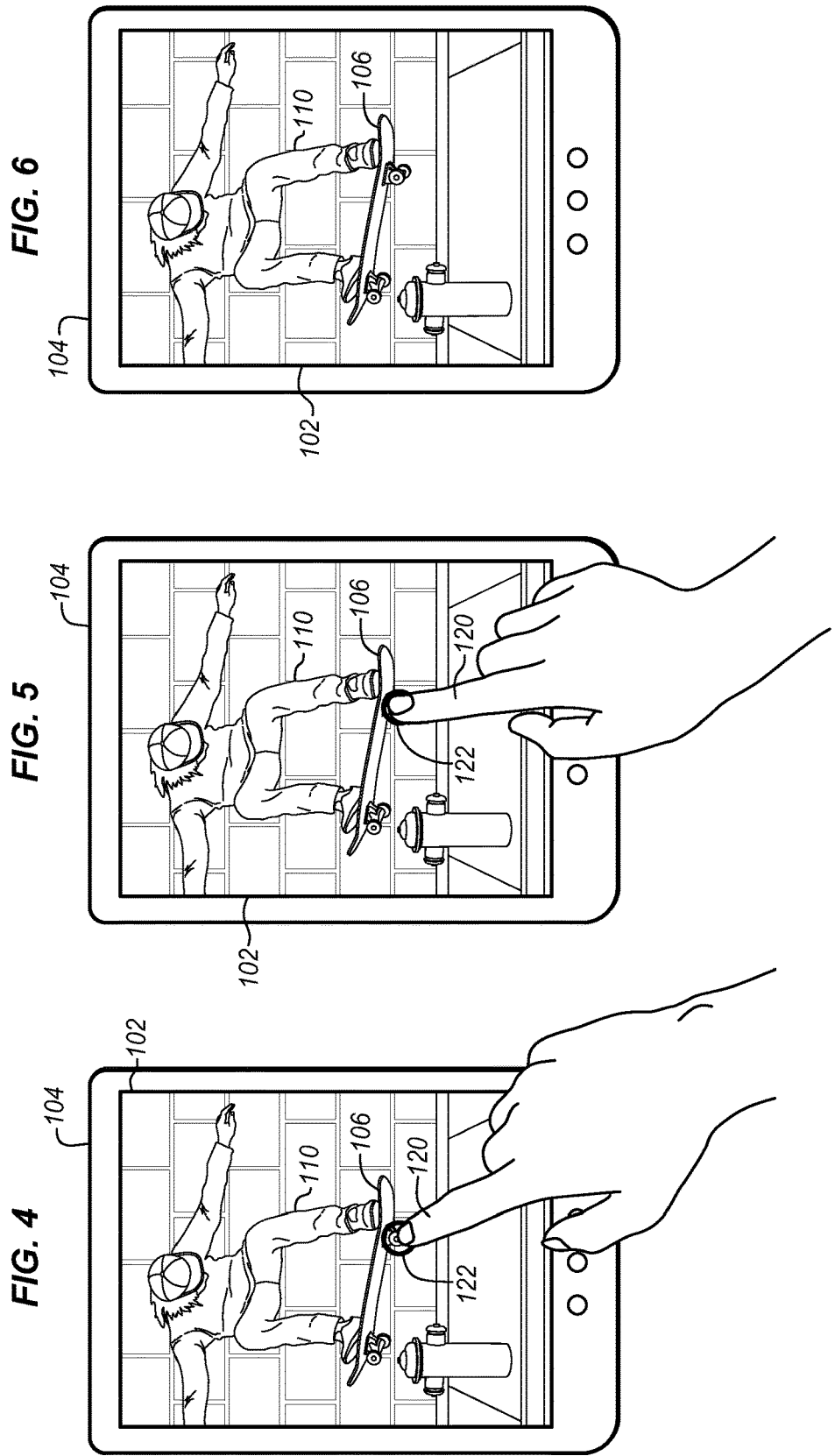

IMAGE LOCATION SELECTION FOR USE IN DEPTH PHOTOGRAPHY SYSTEM

CLAIM OF PRIORITY

This application claims the benefit of and priority to U.S. Provisional Patent Application No. 62/045,361, by Daniel C. Middleton, et al., filed Sep. 3, 2014, the contents of which are incorporated herein by reference.

FIELD

The present description relates to depth photography systems and, in particular to determining a location in an image that is selected by a user.

BACKGROUND

Measuring real world sizes in photographs is emerging as a valuable and important capability in portable devices such as smartphones, tablets, and cameras. Size measurements may be used for entertainment and recreational purposes e.g. how big is that fish I caught, to utilitarian purposes, e.g. how much paint will this wall require, or will that couch fit in my house. The affordability of accurate small cameras has driven great interest and experimentation with uses for multiple camera arrays especially for 3D (three dimensional) capabilities.

When there are two or more cameras on a device, the distance from the cameras to an object in the captured scene is referred to as depth. Typically depth is stored as image metadata for each pixel of an image. Each pixel therefore corresponds to an object that is some distance from the camera. Depth photography systems generate depth maps using disparity information from different images of the same scene taken by different cameras on the device. Depth-enhanced photography enables a wide range of interactive, user interface (UX) applications including estimate-driven measurement and sizing applications in non-precision, consumer use cases.

The depth of an object i.e. its distance from the cameras is measured using a discrete pixel disparity. By comparing the position in image pixels of the object in different images of the scene. Disparity works better for closer items because the disparity is greater. The error in depth determinations grows exponentially with distance from the camera. Disparity maps are also limited by the noise in the two images that are compared.

BRIEF DESCRIPTION OF THE DRAWINGS

Embodiments are illustrated by way of example, and not by way of limitation, in the figures of the accompanying drawings in which like reference numerals refer to similar elements.

FIG. 4 is a diagram of a user command to select an image position applied to an image that is presented on a touch screen device according to an embodiment.

FIG. 5 is a diagram of a user command to cancel an image position selection applied to an image that is presented on a touch screen device according to an embodiment.

FIG. 6 is a diagram of the touch screen device showing that the user command is canceled according to an embodiment.

DETAILED DESCRIPTION

The usefulness of depth measurement is affected by the limited accuracy as well as the difficulty in providing a suitable user interface. Naturally a user's finger or a pointer displayed on a screen is much larger than a pixel in an image. However, depth is assigned for each pixel and may vary greatly from one pixel to the next. It may not always be clear which pixel the user intends to indicate.

Touch and gesture-based devices including smartphones and tablets have inherent display limitations. The system cannot always be certain of the user's intent when a user is touching or selecting a region on the display. This is particularly true when the user touches or selects at or near an end-point or edge of the pixels representing a particular person, object or thing. The results may be experienced as unpredictable and erratic at times because of noise or because of the low resolution of the disparity information in the depth-enhanced image.

The experience is improved by improving the precision with which a pixel is selected by the user. A heuristic approach may be used to increase the accuracy of a radial sampling technique. This yields more selection accuracy when users are touching the display to select specific endpoints. It also overcomes errors and disparity limitations.

Embodiments provide for a variety of different uses of and user interactions with depth information. These interactions may be provided on a variety of different devices from a conventional desktop or workstation, to a portable tablet to a wearable device. A smart device, Internet kiosk, or in-store display might use a touch system where selection accuracy is necessary for delivering a robust, consumer experience. Other applications using interactive displays or viewers might also use radial sampling techniques as described. The described techniques have broad application potential now and in the future.

Figure 1:
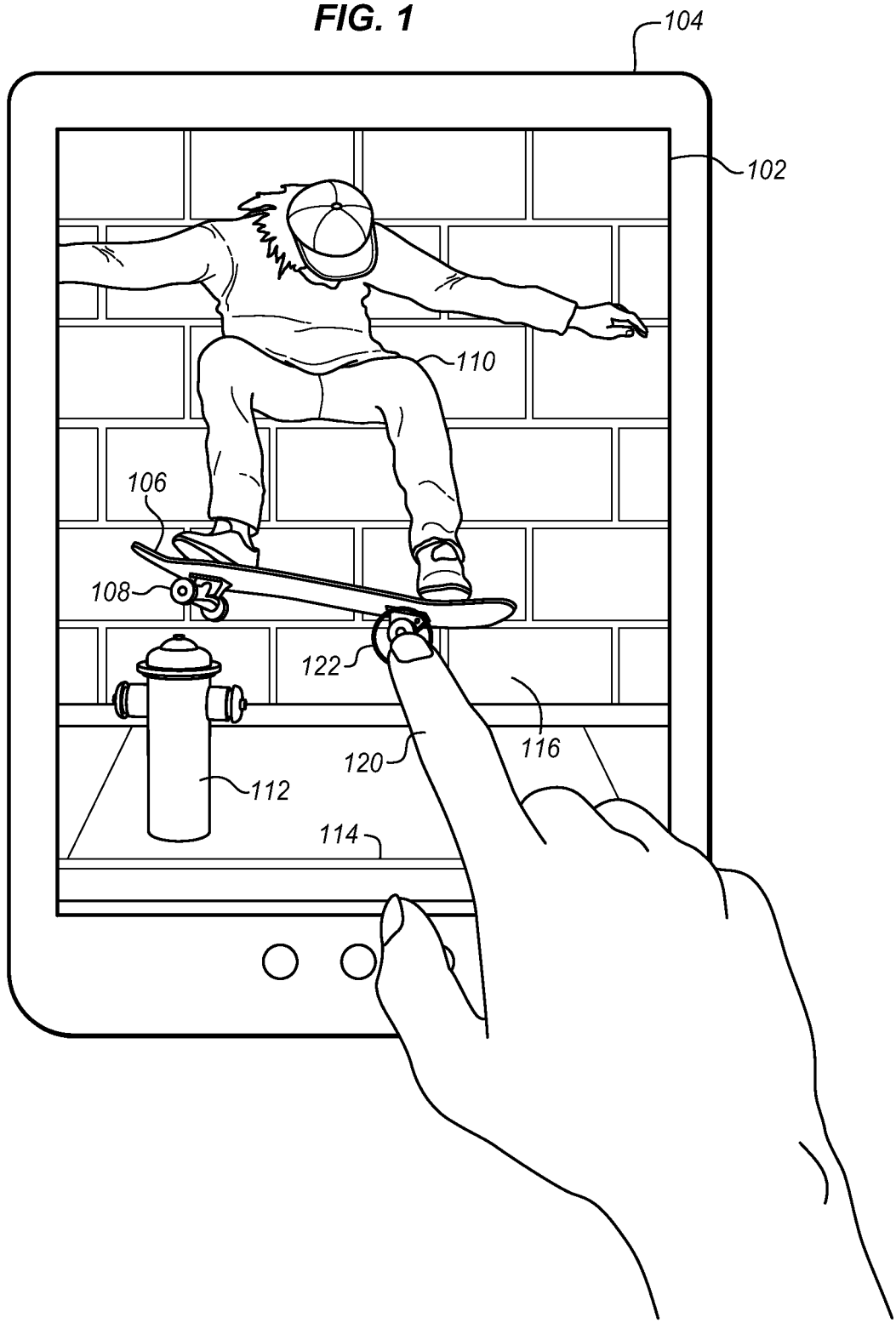
FIG. 1 is a diagram of a user command to select an image position applied to an image that is presented on a touch screen device according to an embodiment.
Figure 2:
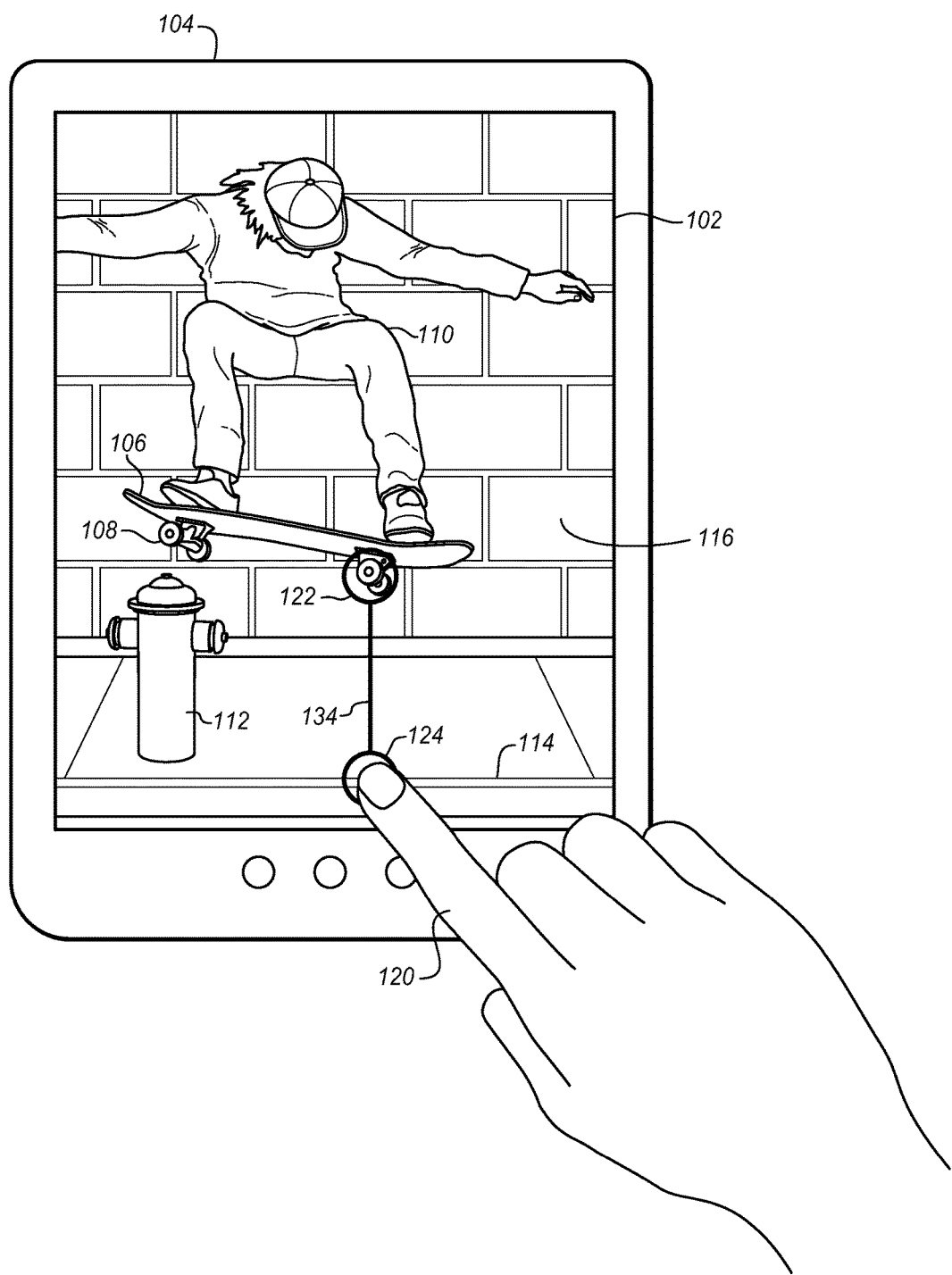
FIG. 2 is a diagram of a user command to select a second image position applied to an image that is presented on a touch screen device according to an embodiment.
Figure 3:
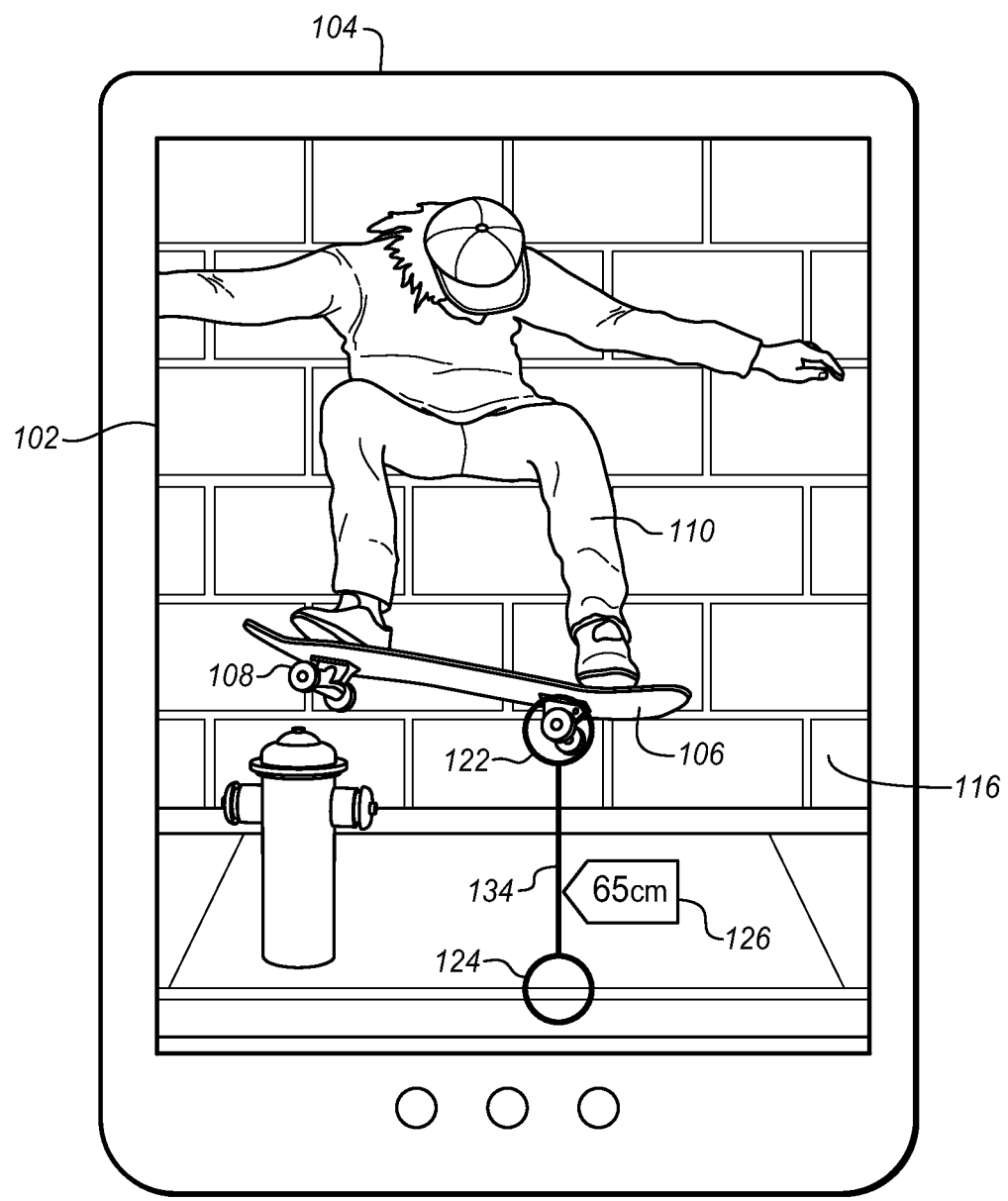
FIG. 3 is a diagram of a presentation of a metric by the touch screen device in response to selecting the two positions according to an embodiment.

FIGS. 1-3 show a sequence of interactions that allow for point-to-point gestures using a short press. FIG. 1 is a diagram of a user display which may be portable or fixed. While the interactions are shown as being performed using a finger, the same principles and techniques may be applied to a stylus, a mouse, a trackball, a drawing tablet with or without a display or a trackpad or touchpad.

In the example of FIG. 1, an image 102 is displayed on a display of a tablet or screen 104. The image has a first foreground object 106 in the form of a skateboard with wheels 108 and a rider 110. The image has a second foreground object in the form of a fire hydrant 112 and a third foreground object in the form of a curb 114. The curb is on an edge between the street and a sidewalk. The street and the sidewalk, however, do not have very many features that would allow for the distance to the camera to easily be determined. The foreground objects are presented in front of a backdrop or background object 116 in the form of a brick wall. The particular scene is provided as an example and the same techniques may be applied to images with other foreground and background objects that may be closer or farther from the camera device that captured the image. In some embodiments, the image is captured by one device in the form of a camera, a tablet, or a smartphone and the image is presented on the display of a second device, such as a computer, workstation, or remote viewer.

In FIG. 1, a user has indicated an object on the image. In this case, the user makes a short tap on the screen on the right hand side skateboard wheel 108 with a finger 120. As mentioned above, the same gesture may be made using a variety of other input devices. This gesture may be for example a short tap on the screen or any other suitable gesture. The gesture causes the system to generate a first metric dot 122. Magnifying glasses are used in other examples to resolve ambiguous gestures, but in this example no magnifying glass is shown. The first dot is animated, for example by glowing, to indicate that the marker 122 has been placed.

In FIG. 2, the same image 102 and device 104 are shown. The user then applies a second tap on the screen 102 with the same finger 120 to generate a second metric dot 124. This dot is on the curb 114. Other commands and gestures may be used to achieve the same effects, depending on the particular implementation.

The system then completes a metric line between the two dots. In FIG. 3, the user lifts the finger off the screen. The system then completes the metric line and a metric flag appears to show the metric. In this case, the distance from the wheel to the curb is 65 cm. Using such a system, the user can determine the height of the board rider's jump. Using other images a wide range of different metrics may be determined for other activities and purposes.

FIGS. 4-6 show another sequence of point-to-point gestures. This sequence is a short press and cancel. FIGS. 4-6 show the same image 102 on the same device 104 with the same skateboard 106 and rider 110 although embodiments are not so limited.

In FIG. 4, the user uses a finger 120 to make a short tap on the screen to create a first metric dot 122 in this case in the same position over the right hand side wheel 108 of the skateboard. This is the same gesture as in FIG. 1 and will have the same result as in FIGS. 1 and 2.

In FIG. 5, the user has canceled this metric dot by pressing on the metric dot with the finger. This press may be a second press, a press together with another gesture or press, or the user may hold the same press. In FIG. 6, the metric dot has now disappeared in response to the cancel command. Other commands and gestures may be used to achieve the same effects, depending on the particular implementation.

Figure 7:
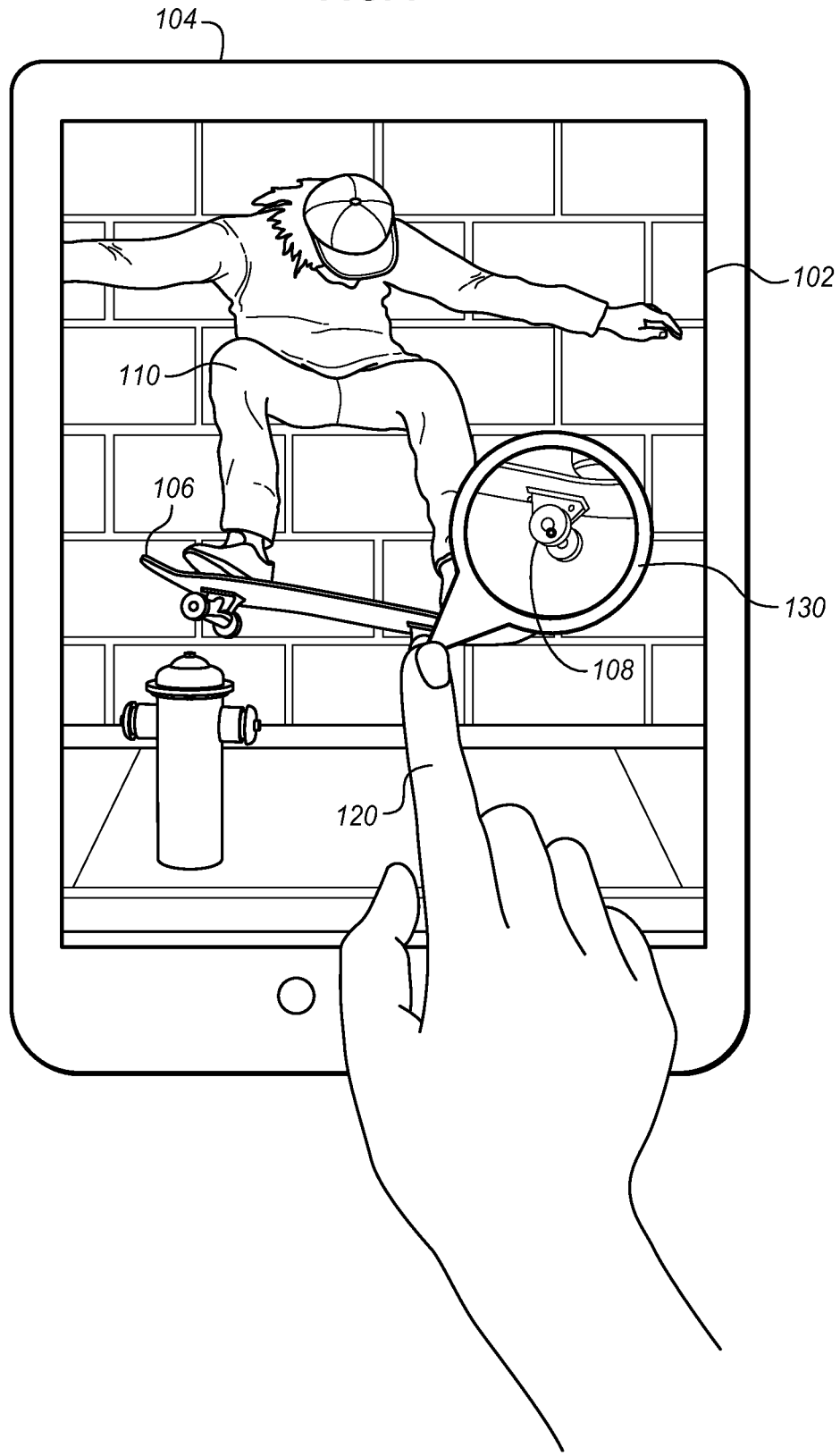
FIG. 7 is a diagram of a user command to select an image position applied to an image that is presented on a touch screen device with a magnifier according to an embodiment.
Figure 8:
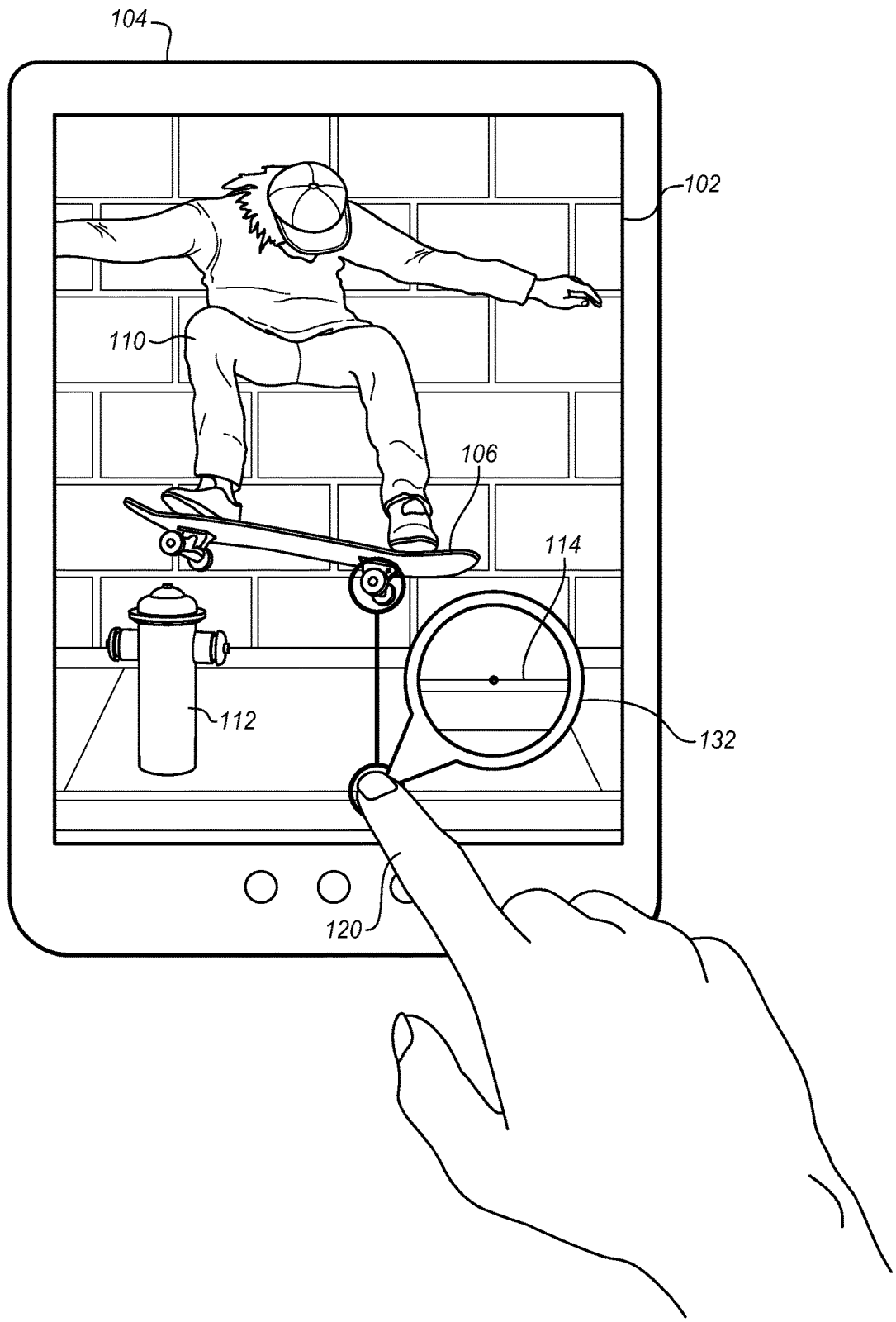
FIG. 8 is a diagram of a user command to select a second image position applied to an image that is presented on a touch screen device with a magnifier according to an embodiment.
Figure 9:
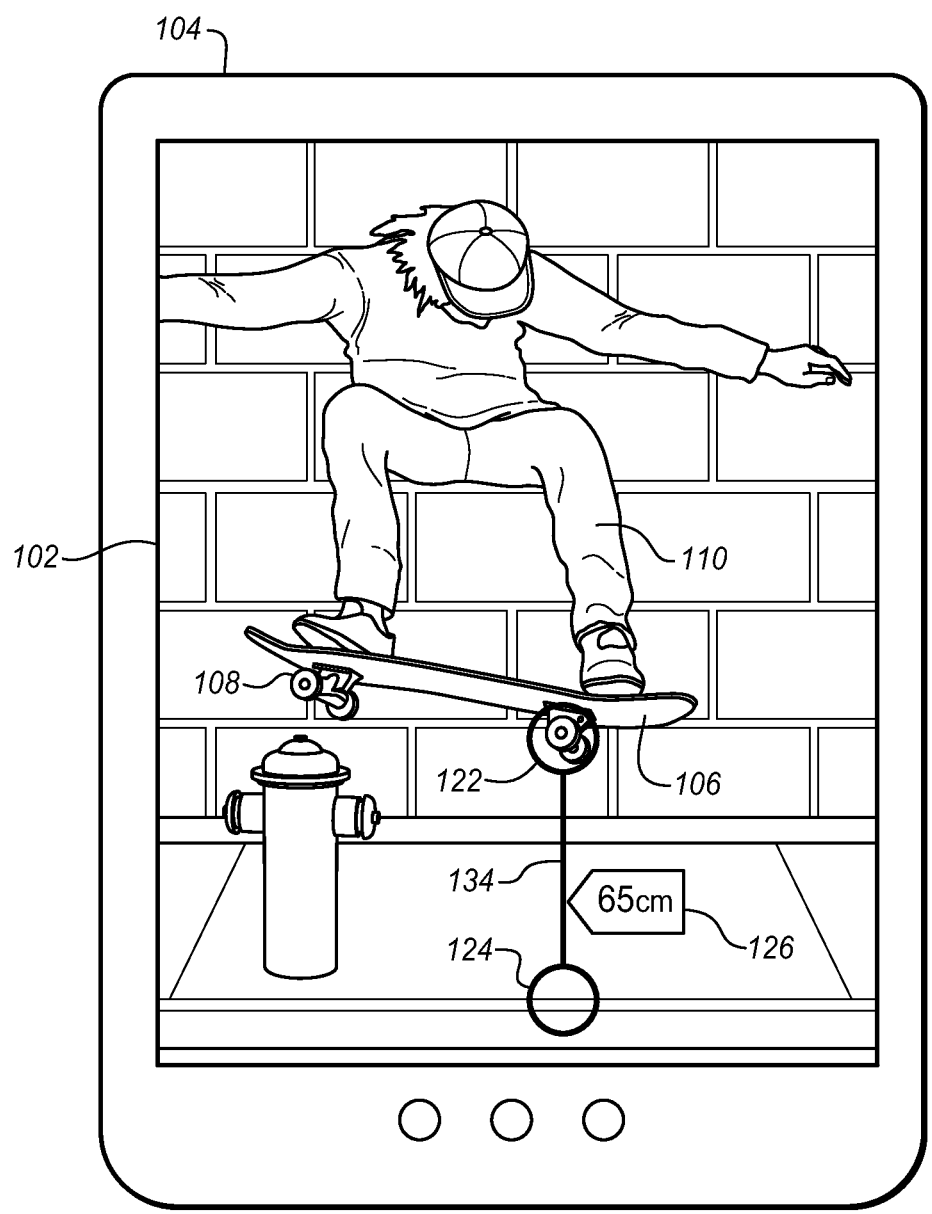
FIG. 9 is a diagram of a presentation of a metric by the touch screen device in response to the command according to an embodiment.

FIGS. 7-9 show an alternative sequence of gestures to obtain the same results as in FIGS. 1-3. In FIG. 4, the same image 102 is shown on the same device 104. The user uses different point-to-point gestures in this case a long press and hold.

In FIG. 7, the user gestures with a long press on the screen using the same finger 120. This causes the system to create the first metric dot 122 as in the example of FIG. 1. With the long press gesture however, a magnifying glass 130 is presented while the user presses and holds. The magnifying glass enlarges the area of the screen that the user is touching in a second location so that the user can see this portion of the screen in more detail. The user may then moves the same finger to more precisely select a point for the metric dot from which the measurement will be made. In this case, the user can more precisely choose between the wheel 108, the skateboard 106, the rider 110 and the brick wall 116 which are all very close to the position of the finger. Other commands and gestures may be used to achieve the same effects, depending on the particular implementation.

In FIG. 8, while still holding the press, the user uses the finger to drag from the first dot to any other position on the screen where a second metric dot 124 will appear. The system draws a metric line 134 to follow the movement of the finger. The metric line is completed when the user lifts the finger off screen. As shown in FIG. 9, lifting the finger completes the gesture and causes the metric flag to appear with the distance measurement. Other commands and gestures may be used to achieve the same effects, depending on the particular implementation.

Figure 10:
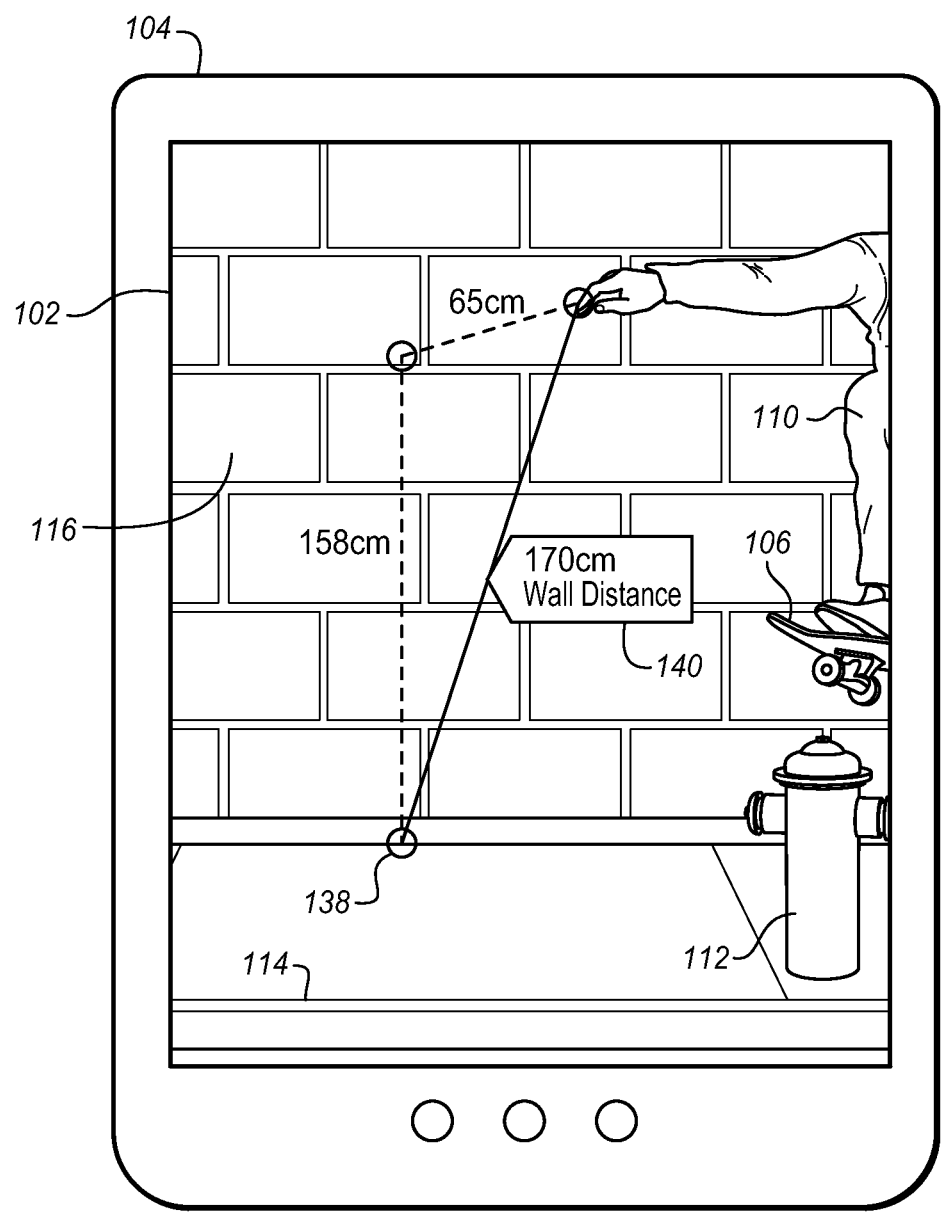
FIG. 10 is a diagram of an alternative presentation of a metric on the touch screen device according to an embodiment.
Figure 11:
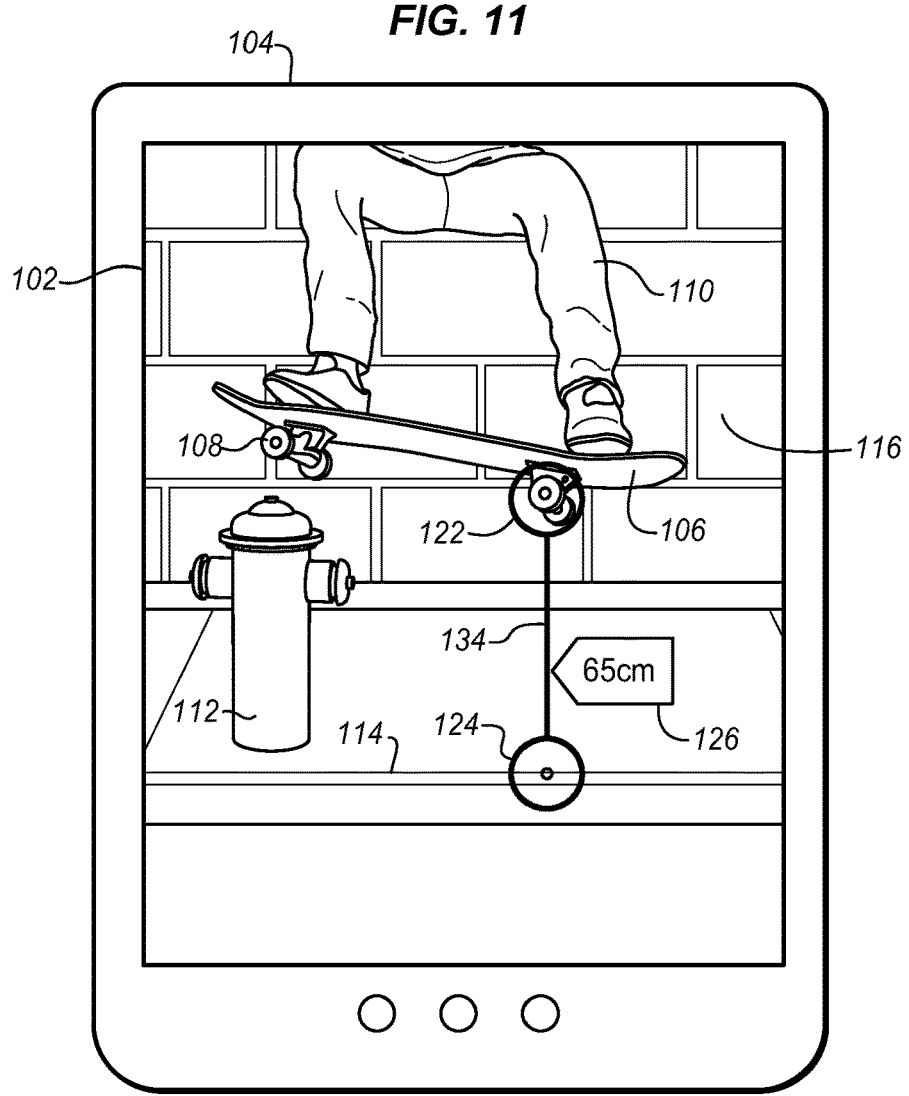
FIG. 11 is a diagram of another alternative presentation of a metric on the touch screen device according to an embodiment.

FIGS. 10 and 11 show examples of two different kinds of measurements that may be performed by the system based on the types of gestures described above. FIG. 10 shows an actual distance measurement. This metric shows an actual distance that is calculated from the (X, Y) distances. The image 102, being a portion of the same image as in FIG. 1 presents the foreground object being the rider 110 and in particular the rider's hand. The user has identified two points using the techniques described above, the first is the rider's hand 110 and the second is a spot 138 at the base of the brick wall. A metric flag 140 shows the distance as 170 cm.

Using the image, the system may determine the distance using depth information. The depth information indicates that the hand is in the foreground and in front of the brick wall by 74 cm. Using scaled pixel information combined with the distance of the wall from the camera, the system may determine that the hand is above the sidewalk by 158 cm. The actual distance from the hand to the base of the brick wall can then be determined as 170 cm using the squares of the distances according to the Pythagorean theorem.

FIG. 11 is a portion of the image of FIG. 9 in which the metric flag 126 shows a distance between the two objects 122, 124 which are about on the same plane or the same distance from the camera. The metric has no (X, Y) distances but only a Z distance displayed. This metric shows only the distance between the two metric dots because they are on a similar plane. The distance can be determined by determining the distance of the objects and then scaling the image accordingly.

Figure 12:
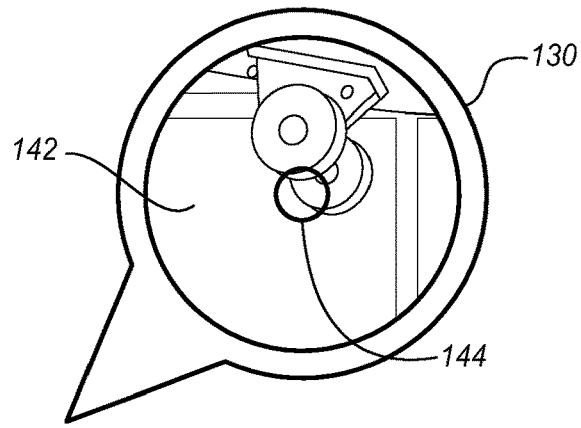
FIG. 12 is a diagram of a presentation of a magnifying glass on the touch screen device according to an embodiment.

FIG. 12 is an expanded view of the magnifying glass 130 of FIG. 7. The magnifying glass is a view generated by the system to aid the user in unambiguously identifying a particular object in the scene. As shown in FIG. 12, the magnifying glass has an image preview area 142 that is an enlarged area underneath the user's finger 120. This view is enlarged or upscaled based on the size of the overall screen and the particular use for the device. The preview area includes both the skateboard wheels and the brick wall.

The magnifying glass also has a pixel average area 144. This is a smaller inner circle in the magnifying area to show how the user's gesture will be interpreted. This may be determined in different ways. In some embodiments, the system averages the pixels within the preview area to determine the center point of the preview area. This will then serve as the position of the metric dot.

Figure 13:
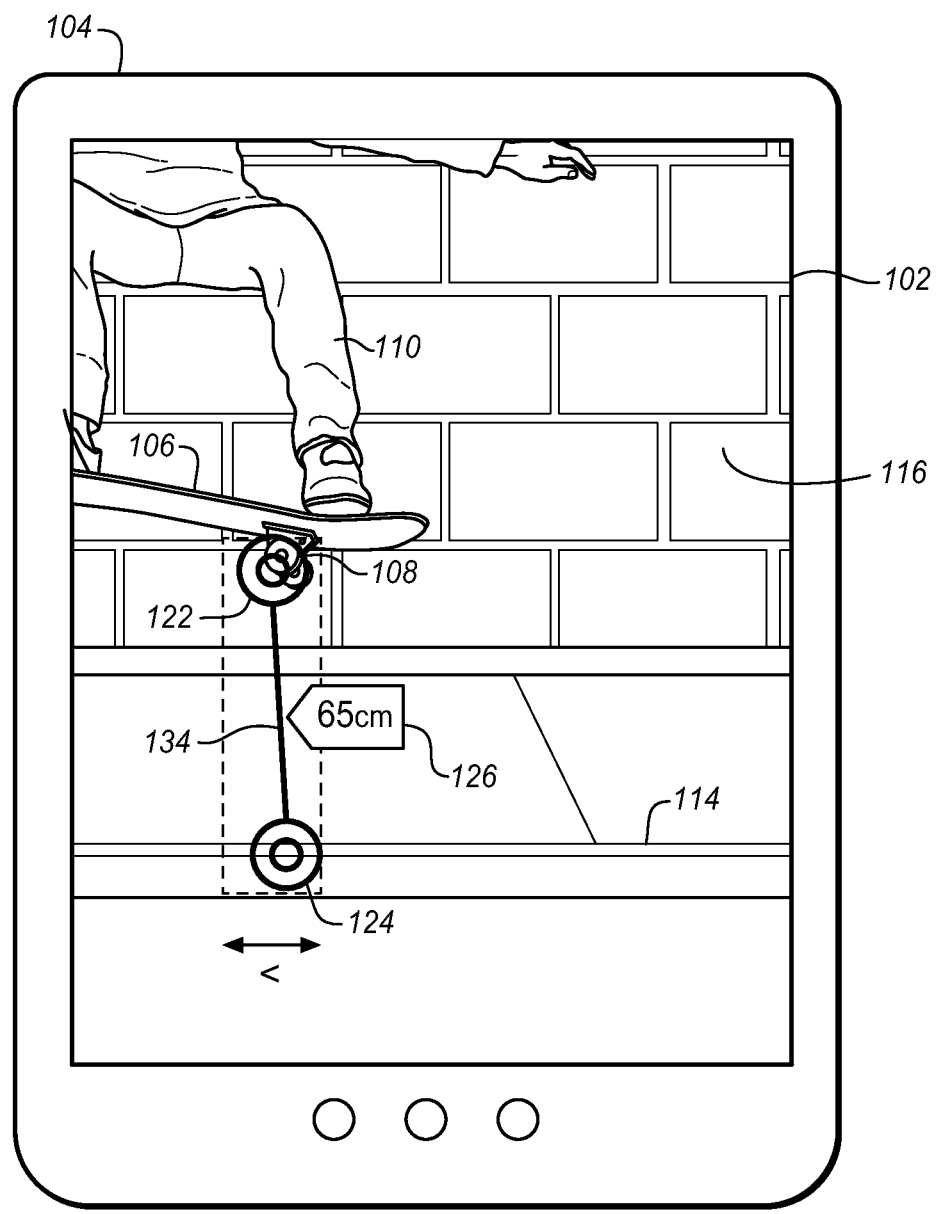
FIG. 13 is a diagram of a presentation of a metric in a single vertical plane by the touch screen device in response to the command according to an embodiment.
Figure 14:
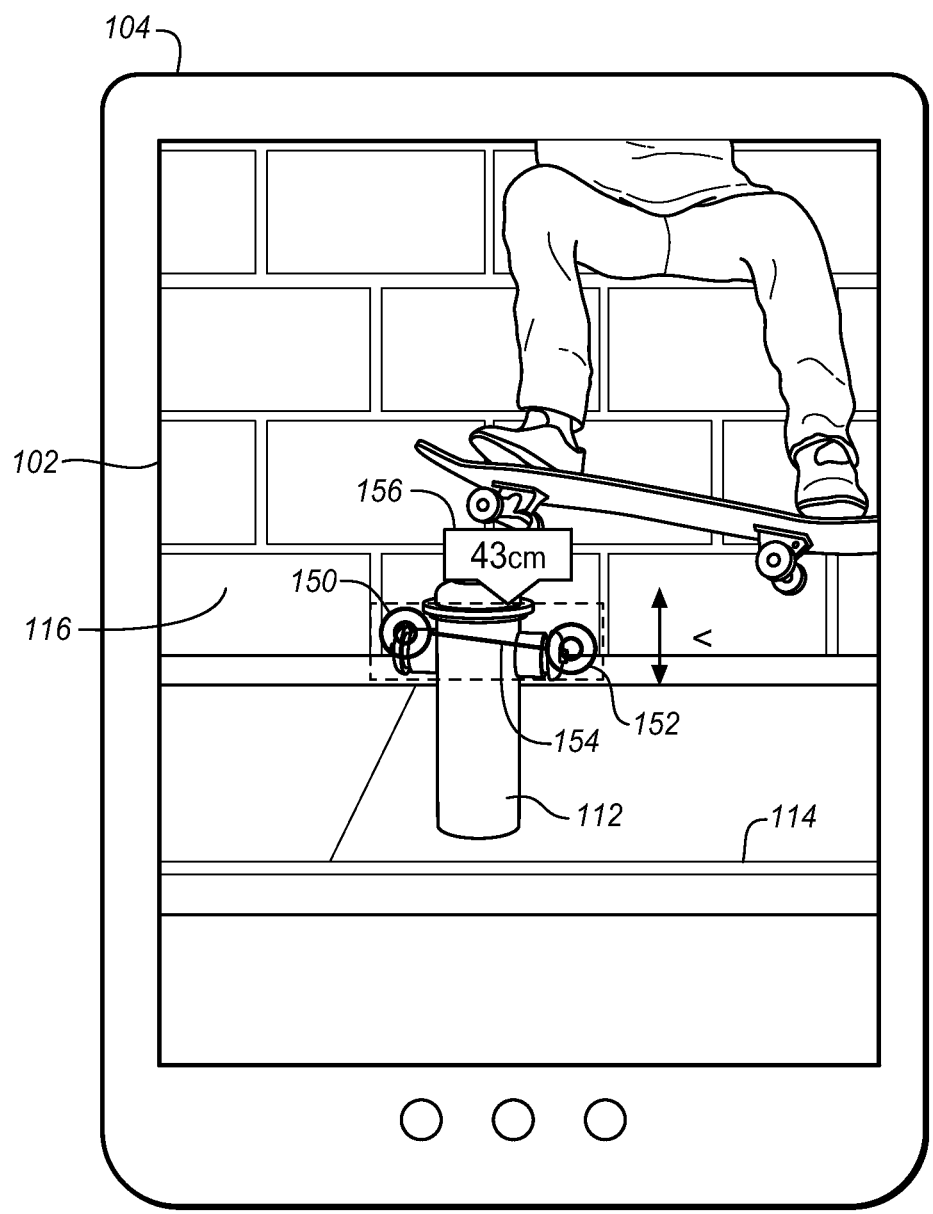
FIG. 14 is a diagram of a presentation of a metric in a single horizontal plane by the touch screen device in response to the command according to an embodiment.

FIGS. 13 and 14 show an example of using a distance threshold to determine how to determine a distance and how to display a distance. FIG. 13 shows a portion of FIG. 3 in which the metric line 134 connects two metric dots 122, 124. In FIG. 13, the metric dots are on a similar plane and are a distance V less than some threshold apart from that similar plane. The dashed lines show the bounds provided by the threshold on either side of the two metric dots. In this case, the threshold is selected as 5% apart from the plane, however, the particular threshold may be adapted to different applications. There is in this image no dashed triangulated line as in FIG. 10 to show distances in different planes. The actual distance may still be measured or the system may estimate the distance by determining the distance only in the vertical y plane and ignoring any horizontal x, or depth z distances.

FIG. 14 provides another example in which two metric dots 150, 152 are on either side of the fire hydrant 112 on the brick wall 116. The dots are nearly at the same height or in the same horizontal x plane. The dashed lines show the vertical distance V between the two points as less than the threshold. The metric window indicates a distance of 43 cm between the dots. As in the example of FIG. 13, there are no dotted lines. The distance may consider only the horizontal distance or may be a corrected Euclidean distance even without showing the components of it. The threshold allows the user gestures to be interpreted as if the user precisely selected a vertical or horizontal distance. If this is the most likely case, then the user will be more pleased with the results than if very small misalignments in the gestures render cause diagonal distances to be computed.

Figure 15:
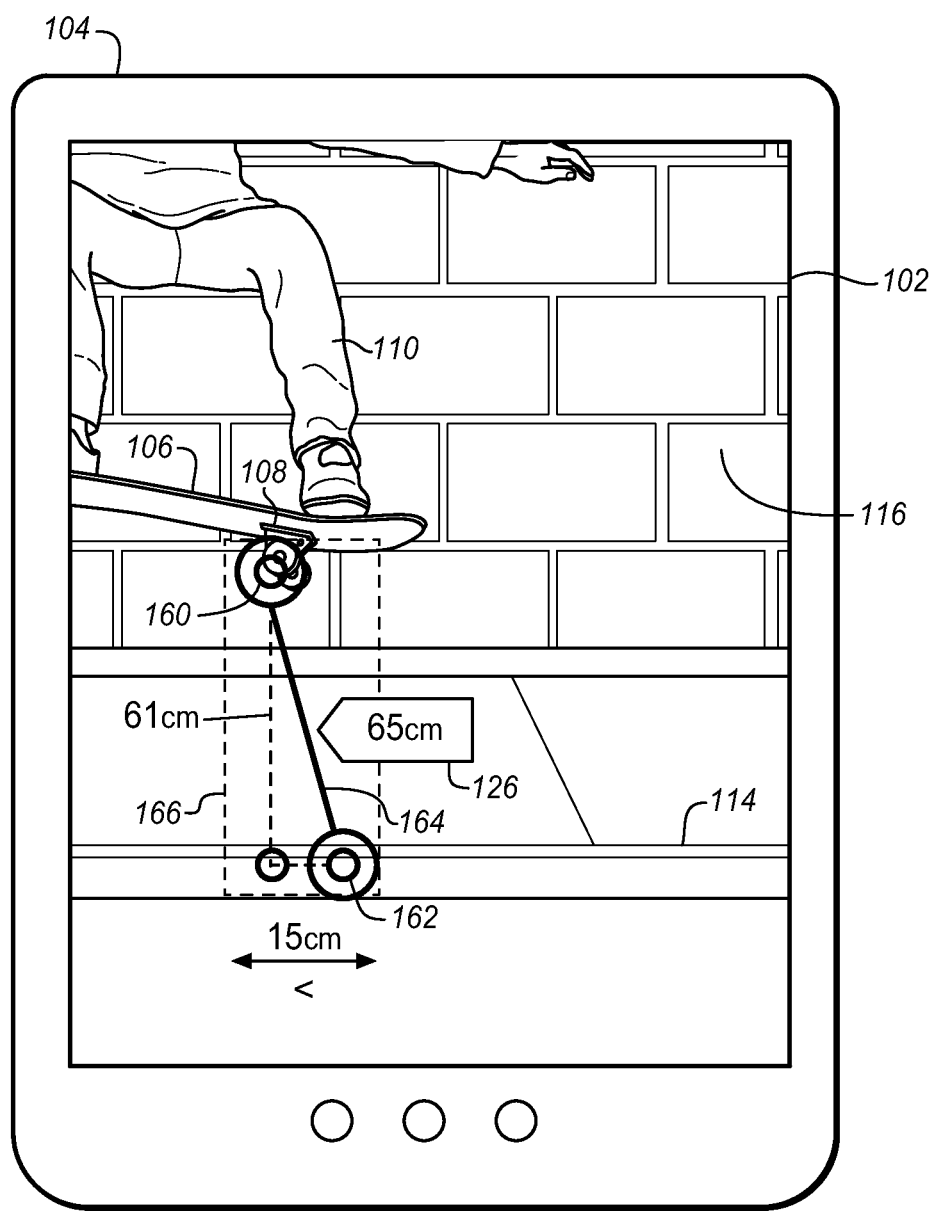
FIG. 15 is a diagram of a presentation of a metric across a diagonal by the touch screen device in response to the command according to an embodiment.
Figure 16:
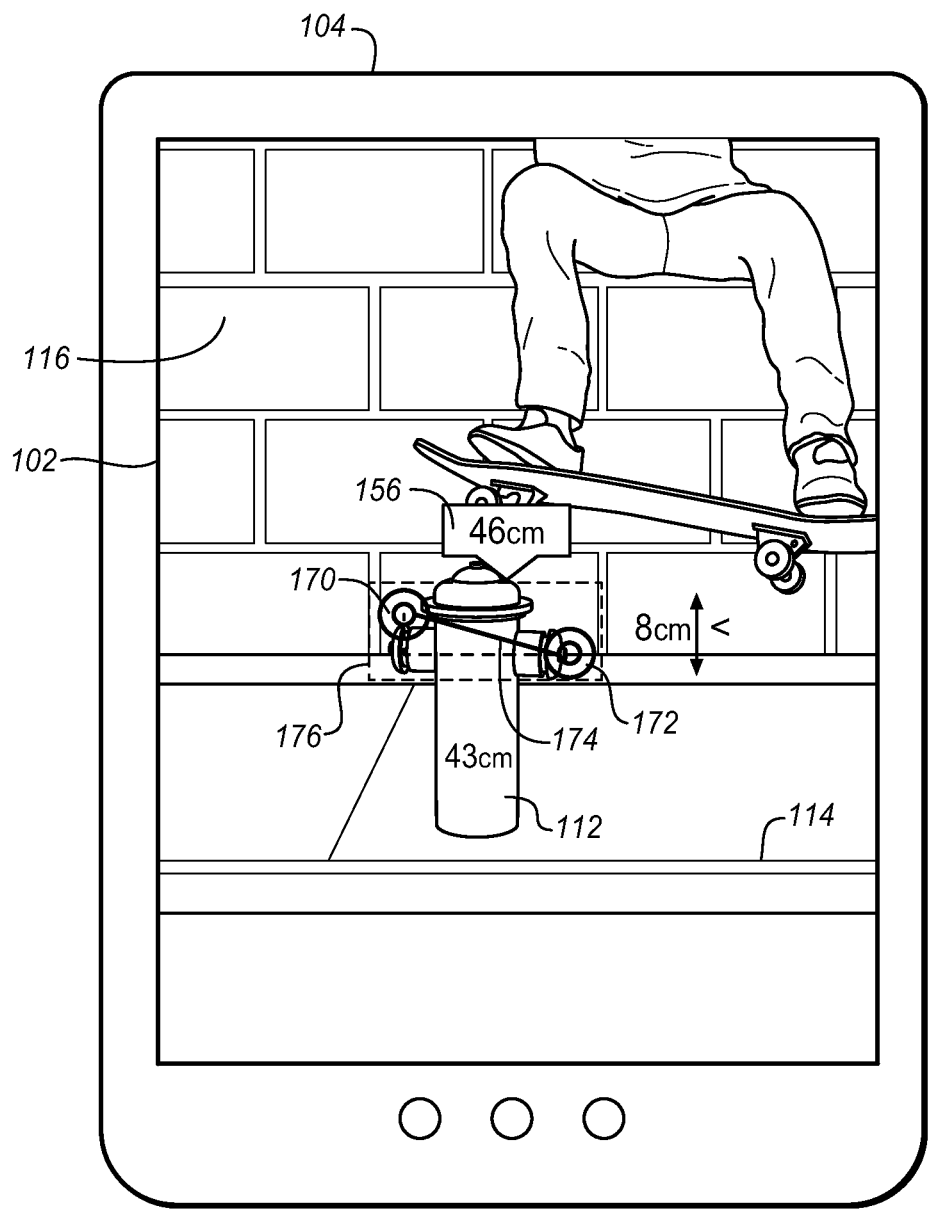
FIG. 16 is a diagram of a presentation of a metric across another diagonal by the touch screen device in response to the command according to an embodiment.

FIGS. 15 and 16 show an example in which the metric dots are not aligned in any one plane within the threshold. In this case, the dots are more than 5% apart from the plane. As a result the dashed triangulated line is shown between the two points. This may be used to provide additional information and to help the user know that the dots are not on the same plane.

In FIG. 15, the user has selected a first dot 160 on the wheel 108 of the skateboard and a second dot on the curb 114. The dots are not vertically aligned and so the metric line 164 is indicated as having a vertical component and the horizontal component V and traversing a total of 65 cm on the angle. In addition the lengths of the horizontal and vertical components are also given.

In FIG. 16, there is a dot 170, 172 on either side of the hydrant 112. The dots are not horizontally aligned and so the metric line 174 clearly has an angle to extend the 45 cm between the metric points. Again the vertical component V and the horizontal component are both greater than the threshold and are shown. In the case of FIG. 15, the metric points are on foreground objects, the wheel and the curb, while in FIG. 16, the metric points are on the background wall. As a result the distance is on a different scale. For most systems the same number of pixels on a distant object corresponds to a longer distance than that number of pixels on a closer object. Even though these examples do not show a substantial component in the z plane, the depth of the object is still considered in determining the distance.

In each of the selection gestures above, the user is attempting to indicate a specific position on an object using an indicator, such as a finger that is much larger than any one pixel representing the object and in some cases may also be much larger than the entire object such as a skateboard wheel or a curb. This causes ambiguity as to what the user intends. Even with the magnifying glass technique, it may be difficult to indicate a specific point, position, or pixel in the image. In some embodiments, the system reduces the selection by the user to a single pixel. This pixel is located on for example, the skateboard, wheel, the rider's hand, a place on the curb, or a place on the brick wall. Given the size of a pixel relative to any pointer, cursor, or indicator, it is difficult for the user to indicate a particular pixel.

A software system and computational method is described herein for applying radial sampling-based heuristics to selecting a single pixel for 3D measurement applications and for other purposes. In some embodiments, two basic operation are used. First, the user's press, point, or click is sampled with statistical understanding of the underlying data and second, user intent is implied and incorporated into the sampling process.

An enhanced or hybrid version of radius sampling-based heuristics is described. This may be used to refine the pixel selection accuracy. Consider that the actual selected position is always somewhere between two disparity layers, that is two different distances from the camera, or positions in different z-planes. The intended position can be implied by sorting or by looking for strong pairs in a histogram of adjacent z-planes.

Figure 17:
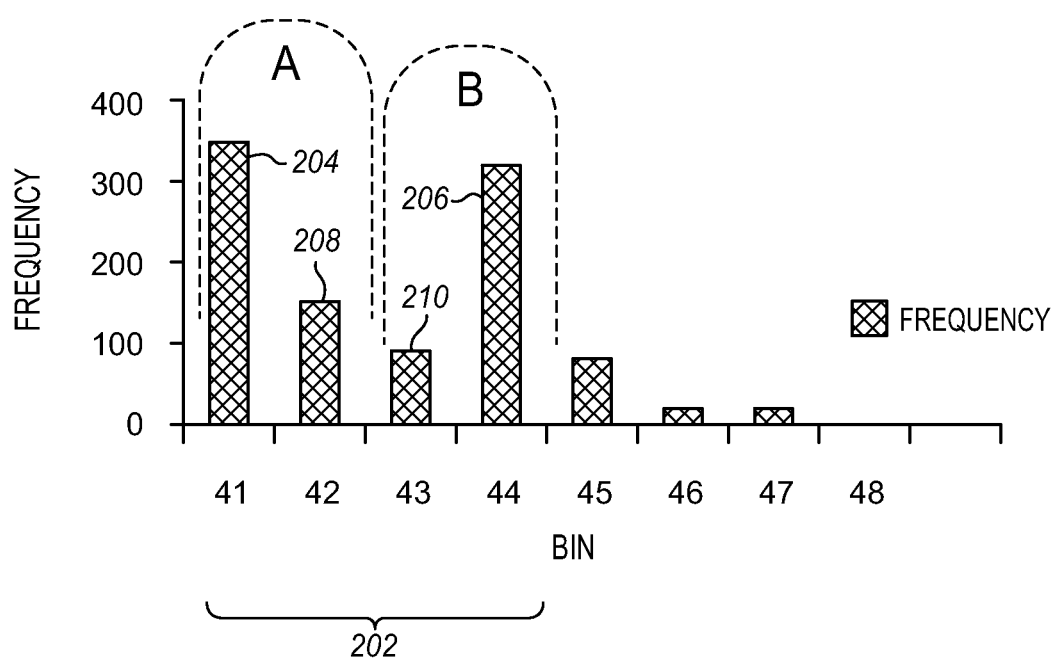
FIG. 17 is a histogram of distances in an image according to an embodiment.

FIG. 17 is a hypothetical histogram of a portion of an image. Each bin corresponds to a range of distances or disparities as shown on the x-axis in this partial view from 41 to 48. The finger press is ambiguous and spreads over a range 202 so that the user may be selecting a pixel at disparities of 41, 42, 43, or 44 corresponding to bars 204, 206, 208, 210. The height of each bar is used here like a bar graph to indicate a relative number of pixels associated with the corresponding disparity or distance. Based on the histogram, it is most likely that the user selected one of the more numerous pixels that were binned as shown by bars 204, 206 with the largest number of binned pixels. The histogram suggests that there are two likely distances 41, 44. Comparing the two most likely candidate bins, the bar on the left is higher indicating that the corresponding bin has more binned pixels. The bin for distance 41 is therefore the most likely bin.

The result from this evaluation can be further refined by averaging the most likely result 41 with one or more neighbors, e.g. 42. The average may be weighted by the number of pixels falling into each bin. The final result provides a very likely actual disparity value.

The histogram approach addresses two difficulties. First, by using the histogram the distances or disparities with very small populations e.g. 43 are avoided. A disparity with such a small population is probably not the skateboard, the curb, or even a wheel, but noise or error. By avoiding the bin with less than some threshold number of binned pixels, these noise values are not picked. Other solutions rely on taking repeated samples of a scene to average out noise. The histogram technique improves results using only a single sample. This is faster and provides success when multiple images are not available.

The described technique uses a sampling radius with a pixel location heuristic based on evaluating the nearest and especially the adjacent z-planes. The radius sampling with an adjacent z-plane heuristic is configurable to broadly accommodate any stereo or multi-camera system.

Second, by averaging the most likely result with its neighbors, the quantum, discrete, or stepped aspect of the disparity map is avoided. Discrete numeric limitations lead to inherent staircase results. This artifact cannot be dealt with by simply picking the best disparity value. Simple averaging is also less suitable for addressing disparity errors. The simple average does not account for the actual statistics of the disparity. For example at a range of 10 m, a measurement error could be off by a meter or more using existing techniques. The weighted average may reduce that error by half or better.

The depth information is typically obtained using disparity. The image is captured at the same time by two or more different image sensors that are separated by some amount of displacement. For an object represented by a particular pixel in one image, the disparity indicates the difference in location of the pixel representing the same object in the other image. The distance from the image sensors to that object is a direct function of the disparity between the corresponding pixels or the two sensors. The correlation between disparity and distance to the actual object will also depend on many other factors most of which are fixed such as the displacement between the two image sensors, and the physical characteristics of the camera system.

Since the depth is directly related to the disparity, any of the statistical and numerical techniques described herein may be performed using either the depth or the disparity. When the depth is needed for a particular pixel or block of pixels, then it may be quickly produced from the disparity.

Considering the nature of disparity, the values of disparity are in terms of the position of a pixel in one image compared to the position of the corresponding pixel in the other image. The displacement that provides the disparity value will always be in terms of a number of pixel positions which will always be an integer. If the disparity should include some fraction of a pixel position, then most techniques will round to the nearest actual position. In addition, for many systems, the cameras are within a few centimeters of each other so that the disparity values are not very large. This causes a genuine pixilation or stair-casing or steps in the disparity values as well as a limited accuracy. The weighted averaging techniques described above overcome these limitations, at least in part.

The results may be improved further using an approach to incorporate user intent into the process. The sampling of the pixel selection described herein accounts for the user's intent in selecting a point. The system chooses between different potential results using a heuristic to select between multiple possible answers. As described herein three possible cases are accommodated, however, there may be more or fewer depending on the particular implementation. The cases in the described embodiments are as follows:

1. the user intends to select a point in a distant area of the map where error is high;
2. the user intends to select a point inside an object; and
3. the user intends to select a point on the edge of an object or in between two z-plane steps.

Figure 18:
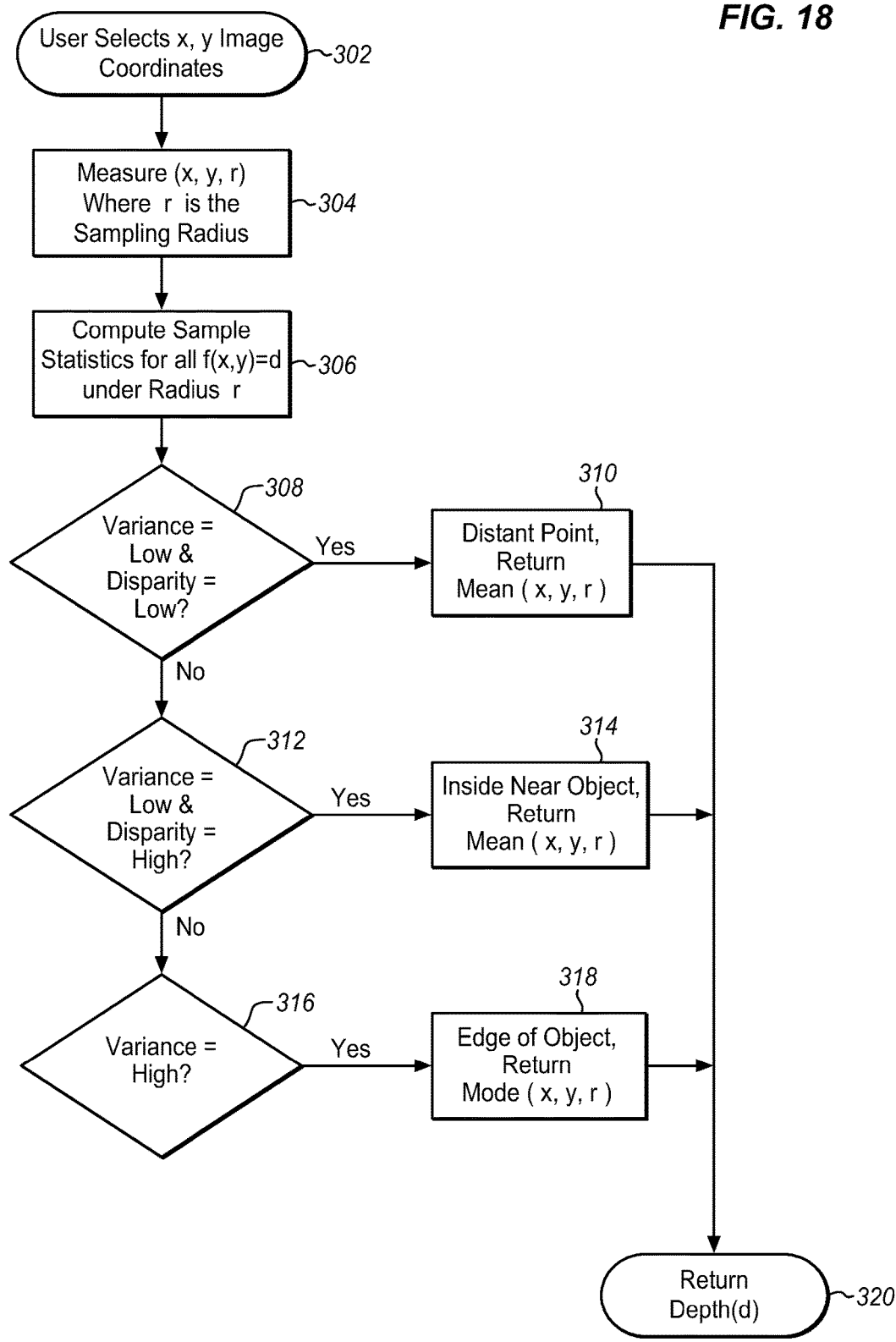
FIG. 18 is a process flow diagram of selecting an object using statistics according to an embodiment.

This approach is illustrated in the example process flow diagram of FIG. 18. The process provides depth data for a selected pixel by accurately determining the user's selection. At 302, the system receives a selection from a user of a position in an image. The image may be captured by local cameras or retrieved from storage. This occurs when the user selects a position in an image. This is shown for example with the finger touch of FIG. 1, but, as mentioned above, may be done in other ways using different user input devices. The actual touched area is not a single pixel at position (x,y) but an area containing many pixels. In order to convert this touched area into the image coordinates (x,y), a variety of different approaches may be used. A simple approach is to select the center of the touched area.

At 304, a sampling radius r is determined for the user selection. The size of the sampling radius may be selected based on a variety of different factors depending on the particular intended use of the device, the user input device, and the application. The sampling radius may be the same as the area actually touched by the user. Alternatively, the area may be a little larger than the area that the user touched. A larger area takes into consideration that the user may have missed and not touched the intended location but instead a location very near to the intended location. A larger area encompasses alternative positions that the user may have intended and are near the actual position (x,y). The area defined by the radius may instead be smaller than the area actually touched. This considers that the user's finger is larger than necessary and that the user intended to touch a location at or very close to the center of the area actually touched. In the Example of FIG. 12, the radius may define an area the size of the image preview area or the size of the pixel average area or another size.

At 306, the sample statistics are computed for all of the possible candidate selected pixels. In this context, the sample statistics refer to building a histogram such as that of FIG. 17 in which the statistics refer to binning the disparity or the depth values for all of the pixels within the radius r. The candidate selected pixels include the pixel at (x,y) at the center of the area touched and all of the pixels within the sampling radius r from the central pixel (x,y).

After the statistics have been determined, user intent is inferred based on the location and the environment in the image near the location that the user touched. The area within the radius of the selected position as defined by (x,y,r) is compared to objects in the image. This may be done using the statistics. The three cases mentioned above are then tested in turn.

At 308 it is determined whether the user picked a distant object. A distant object in this case is an object for which the disparity is low and therefore the depth information is not very accurate. For this determination, the system determines the variance of the disparity as above and then also determines an average disparity value for the pixels of the area. If the disparity is low then the object of the scene is far away and distances will not be precisely known.

The low variance suggests that the area that the user selected and its vicinity all correspond to the same object or to objects that are at a similar distance from the camera. This variance may be the square of the standard deviation of the disparity for each of the pixels or it may be the average of squares of the deviations from the mean for each pixel. Alternatively other statistics may be used to determine whether the disparity is similar for pixels in the area or not.

For an area with distant objects, the disparity value or the depth value will be about the same for all of the pixels in the area. For distant objects, the low disparity will also be similar because there is less range available with the low values. The system may return at 310 a depth based on an average of the values for all of the pixels in the area defined by r. The mean may be determined as the weighted average of selected pixel depths as described with respect to FIG. 17.

In some embodiments, the statistics may be based on the disparity values determined by the camera system or in post-processing. In such a case, the depth or distance in the captured scene may be derived directly from the disparity. In some embodiments a depth may be assigned to each pixel and so the image statistics are based on depth values and return depth directly without any additional processing.

At 308 if the selected area is not distant as at 308, then it is determined whether the user selection corresponds to a location within the boundaries of an object in the image. This may be determined by looking at the statistics of the pixels. When the disparity is not low but the variance is still low, the higher disparity suggests a closer object for which more information is available.

At 314 if the variance is low and the disparity values are high, then the system also averages the disparity or depth for the pixels and returns the average depth as the result. This is the same result 310 as for the first case.

At 316, if the variance is high, then it may be inferred that the user picked a location at the edge of an object. Here the system cannot know whether the user intended to pick one object or the other, for example a skateboard wheel or a brick wall behind the small wheel. In this case the system at 318 may use the histogram selection and weighted average approach described above with respect to FIG. 17 to select one of the possible objects and provide a weighted average disparity or depth value.

While in the first two cases with low variance the specific position is not crucial, in this case with high variance the position (x,y) received from the user is refined using the histogram and weighted averaging techniques as described. The histogram allows the system to select either a disparity or depth within the object, for example the wheel, or outside the object.

The process ends with the system returning a depth value based on the selected one of the three cases at 320. This depth value may be associated with the selected metric point. The process may then repeat for any additional metric points and the depth may be used in the selection and distance calculations described in the context of for example FIGS. 1-16. Depth values may also be used for a variety of other applications in addition to those shown in FIGS. 1-16.

The techniques described use sophisticated averaging techniques and also account for user intent. This is done with very few additional processing steps and using only a single image. This more rigorous, context-sensitive heuristic and analysis of the pixel sampling improves results for use in measurement and estimate-based applications.

Figure 19:
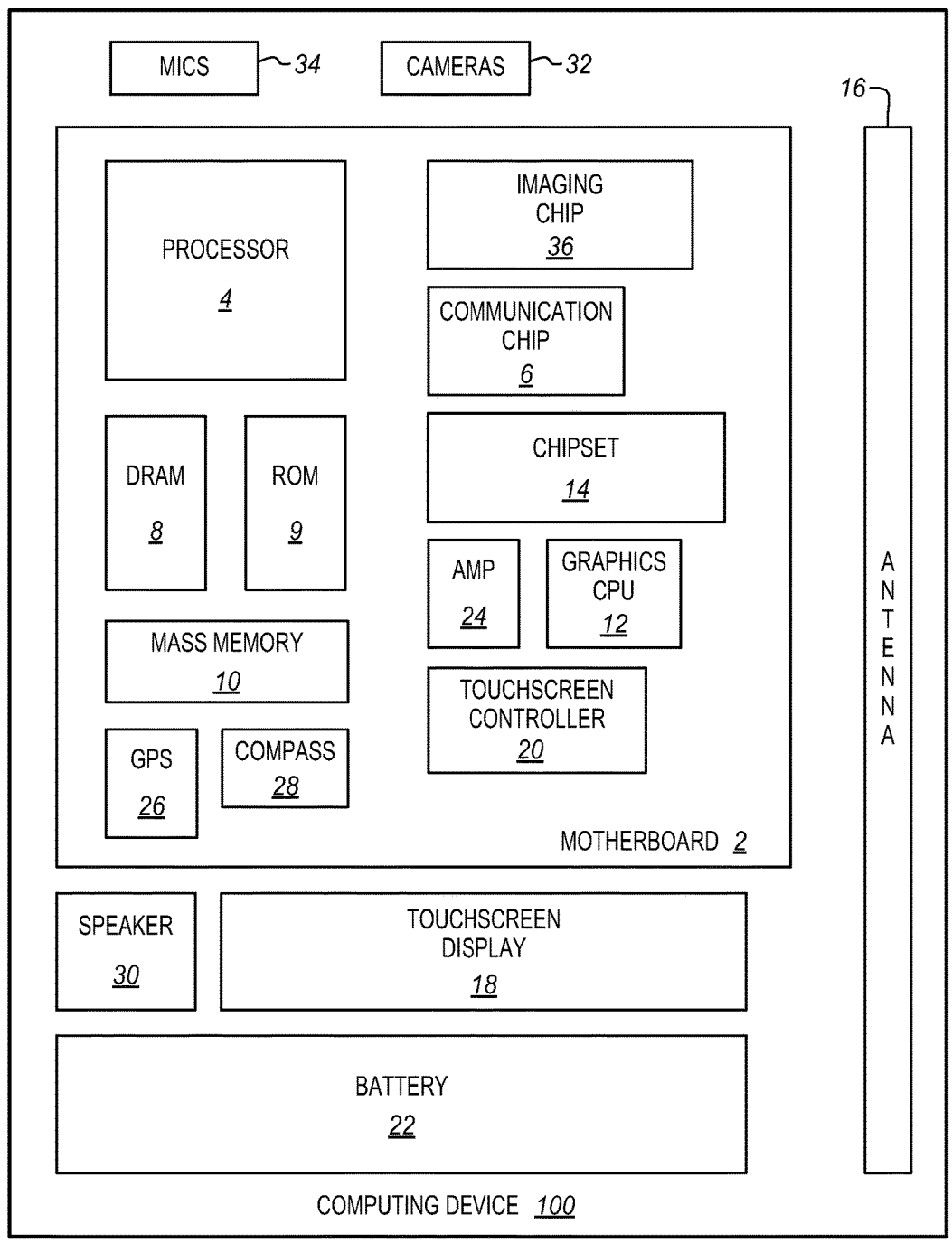
FIG. 19 is a block diagram of a computing device incorporating an image processing system with multiple cameras according to an embodiment.

FIG. 19 illustrates a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented using the cameras 32 to capture images with depth information and the imaging chip 36 to process the images to determine disparity and depth values. The images may be stored in memory 8, 10 for later use. The renderings and interactions shown in FIGS. 1-16 and the determinations described with reference to FIGS. 17 and 18 may be performed in the processor 4 or the imaging chip 36 or both. The graphics CPU 12 may also be used for some purposes. Additional or other memory chips, controllers, CPUs (Central Processing Unit), microchips or integrated circuits interconnected using a motherboard, an application specific integrated circuit (ASIC), and/or a field programmable gate array (FPGA) (not shown) may alternatively be used to provide one or more of the described functions.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a selection from a user of a position in a captured image, comparing the selected position to objects in the image, selecting whether the selected position is intended to be within an object or outside an object, refining the position based on the selection, and determining a depth for an object corresponding to the refined position.

In further embodiments selecting further comprises determining whether the selected position is on an edge of the object.

In further embodiments selecting further comprises using statistics.

Further embodiments include setting a radius encompassing alternative positions near the selected position.

Further embodiments include computing statistics for the alternative positions.

In further embodiments the statistics are developed from evaluating the nearest or adjacent Z-planes of the image.

In further embodiments the statistics are developed using a histogram.

In further embodiments selecting comprises using statistics associated with different positions to determine that the selected position is one of inside an object, on an edge of an object, and in a distant area of a depth map of the image.

In further embodiments determining that the selected position is on an edge of an object comprises determining that variance of the depth map is high near the selected position and determining that the selected position is inside of an object comprises determining that variance of the depth map is low near the selected position.

In further embodiments determining a depth comprises taking a weighted average of values of the depth map near the selected position.

In further embodiments the weighted average uses weights determined based on a histogram of depth map values near the selected position.

In further embodiments refining the position comprises selecting a depth map value using a histogram of depth map values near the selected position.

Some embodiments pertain to a machine-readable medium having instructions thereon that when executed cause the machine to perform operations that include receiving a selection from a user of a position in a captured image, comparing the selected position to objects in the image, selecting whether the selected position is intended to be within an object or outside an object, refining the position based on the selection, and determining a depth for an object corresponding to the refined position.

In further embodiments selecting comprises determining that the selected position is on an edge of an object by determining that variance of the depth map is high near the selected position and determining that the selected position is inside of an object by determining that variance of the depth map is low near the selected position.

In further embodiments if the selected position is determined to be on an edge of or inside an object, then determining a depth comprises taking a weighted average of values of the depth map near the selected position using weights determined based on a histogram of depth map values near the selected position.

Some embodiments pertain to an apparatus that includes means for receiving a selection from a user of a position in a captured image, means for comparing the selected position to objects in the image, means for selecting whether the selected position is intended to be within an object or outside an object, means for refining the position based on the selection, and means for determining a depth for an object corresponding to the refined position.

In further embodiments the means for selecting determines that the selected position is on an edge of an object by determining that variance of the depth map is high near the selected position and determines that the selected position is inside of an object by determining that variance of the depth map is low near the selected position.

In further embodiments if the selected position is determined to be on an edge of or inside an object, then the means for determining a depth takes a weighted average of values of the depth map near the selected position using weights determined based on a histogram of depth map values near the selected position.

Some embodiments pertain to a computing device that includes a memory to store a captured image, a display to present the captured image and to receive a selection from a user of a position in the captured image, a processor to compare the selected position to objects in the image, to select whether the selected position is intended to be within an object or outside an object, to refine the position based on the selection, and to determine a depth for an object corresponding to the refined position.

In further embodiments determining a depth comprises taking a weighted average of values of a depth map of the captured image near the selected position.

In further embodiments refining the position comprises selecting a depth map value using a histogram of depth map values near the selected position.

Some embodiments pertain to a method that includes receiving a first location command to indicate a first location in an image on a screen of a computing device, creating a first metric dot on the screen in response to the first location command in the location of the first location command, animating or glowing the metric dot to indicate that the first metric dot has been placed; receiving a second location command on the screen, creating a second metric dot on the screen in response to the second location command in the location of the second location command, completing a metric line between the first and the second metric dots, receiving a compute command, and showing a metric flag with a measurement of distance of the metric line.

In further embodiments receiving the first and the second location commands comprises receiving short taps on the screen with a user finger.

In further embodiments receiving the compute command comprises receiving a lift of the user finger off the screen Further embodiments include after creating the first metric dot receiving a user finger press on the metric dot and canceling or removing the metric dot from the screen.

In further embodiments the first location command comprises a long press at the first location.

In further embodiments the second location command comprises a draft of the press from the first location to the second location.

Further embodiments include receiving a magnification command at the first location and presenting an enlarged view of the first location on the screen.

What is claimed is:

1. A method comprising:
receiving a first location command at a processor of a computing device to
indicate a first location in a depth image of a scene that is displayed on a screen of the computing device;
determining a first pixel location in the depth image corresponding to the received first location command using a first set of depth values in the depth image, wherein the determining a first pixel location comprises comparing depth values in the depth image within a sampling radius of the first location command, selecting a depth value based on a number of corresponding pixels within the sampling radius for the depth value, selecting the first pixel location related to location of a pixel within the sampling radius and corresponding to the selected depth value;
creating a first metric dot in the first pixel location in response to the first location command in the location of the first location command, the first metric dot having a position including depth corresponding to a first position in the scene;
receiving a second location command on the screen at the processor;
determining a second pixel location in the image corresponding to the received second location command using a second set of depth values in the depth image;
creating a second metric dot in the second pixel location in response to the second location command in the location of the second location command, the second metric dot having a position including depth corresponding to a second position in the scene;
determining a metric line by the processor between the first and the second pixel locations in the image;
completing a metric line in the scene between the first and the second metric dots;
receiving a compute command from a user at the processor; and
showing a metric flag on the screen with a measurement of distance in the scene of the metric line.

2. The method of claim 1, wherein receiving the first and the second location commands comprises receiving a respective first and second tap on the screen with a user finger.

3. The method of claim 1, further comprising after creating the first metric dot receiving a user finger press on the metric dot and canceling or removing the metric dot from the screen in response to receiving the user finger press.

4. The method of claim 1, wherein the first location command comprises a press at the first location.

5. The method of claim 4, wherein the second location command comprises a dragging of the press from the first location to the second location.

6. The method of claim 1, further comprising:
receiving a magnification command at the first location;
presenting an enlarged view of the first location on the screen; and
receiving a further first location command to indicate of the first location in the enlarged view.

7. The method of claim 6, wherein receiving the first and the second location commands comprises receiving a respective first and second taps being made on the screen with a user finger and wherein receiving the magnification command comprises receiving a press on the screen that is longer in time than the first and second tap being made on the screen.

8. The method of claim 6, wherein presenting an enlarged view comprises presenting an enlarged view in a second location on the screen.

9. The method of claim 1, wherein highlighting comprises at least one of animating and glowing.

10. The method of claim 9, further comprising drawing a metric line on the screen during the dragging to follow the movement of the dragging.

11. The method of claim 10, further comprising completing the metric line in response to receiving a lifting of the press from the image.

12. The method of claim 11, further comprising showing the metric flag upon receiving the lifting of the press.

13. The method of claim 2, wherein receiving the compute command comprises receiving a lift of the user finger off the screen from the second metric dot.

14. The method of claim 2, further comprising:
displaying the first metric dot on the screen in the first pixel location;
highlighting the metric dot on the screen to indicate that the first metric dot has been placed;
displaying the second metric dot on the screen in the second pixel location; and completing a metric line on the screen between the first and the second metric dots in response to creating the second metric dot to indicate a distance to be measured, and wherein receiving a compute command comprises receiving a compute command from a user at the processor in response to the displayed metric line.

15. The method of claim 1, wherein selecting a depth value comprises:

binning depth values for the pixels within the sampling radius by depth values into a plurality of bins, each bin of the plurality of bins corresponding a range of depth values;

selecting two bins having more pixels than other bins in the plurality of bins: and averaging the depth values of the two bins and selecting the average as the depth value.

16. The method of claim 1, further comprising:

determining a disparity of the depth values for the pixels within the sampling radius; and alternating using an average of the depth values or selecting a depth value base on a number of corresponding pixels based on the disparity of the depth values.

17. A non-transitory machine-readable medium having instructions stored thereon that, when operated on by the machine, cause the machine to perform operations comprising:

receiving a first location command at a processor of a computing device to indicate a first location in a depth image of a scene that is displayed on a screen of the computing device;

determining a first pixel location in the depth image corresponding to the received first location command using a first set of depth values in the depth image, wherein the determining a first pixel location comprises comparing depth values in the depth image within a sampling radius of the first location command, selecting a depth value based on a number of corresponding pixels within the sampling radius for the depth value, selecting the first pixel location related to location of a pixel within the sampling radius and corresponding to the selected depth value;

creating a first metric dot in the first pixel location in response to the first location command in the location of the first location command, the first metric dot having a position including depth corresponding to a first position in the scene;

receiving a second location command on the screen at the processor;

determining a second pixel location in the image corresponding to the received second location command using a second set of depth values in the depth image;

creating a second metric dot in the second pixel location in response to the second location command in the location of the second location command, the second metric dot having a position including depth corresponding to a second position in the scene;

determining a metric line by the processor between the first and the second pixel locations in the image;

completing the metric line in the scene between the first and the second metric dots;

receiving a compute command from a user at the processor; and showing a metric flag on the screen with a measurement of distance in the scene of the metric line.

18. A computing device comprising:

a screen to display a depth image of a scene and to receive commands from a user; and a processor to display items on the screen, the processor further to:

receive a first location command to indicate a first location in a depth image of a scene that is displayed on a screen of the computing device;

determine a first pixel location in the depth image corresponding to the received first location command using a first set of depth values in the depth image, wherein the determining a first pixel location comprises comparing depth values in the depth image within a sampling radius of the first location command, selecting a depth value based on a number of corresponding pixels within the sampling radius for the depth value, selecting the first pixel location related to location of a pixel within the sampling radius and corresponding to the selected depth value;

create a first metric dot in the first pixel location in response to the first location command in the location of the first location command, the first metric dot having a position including depth corresponding to a first position in the scene;

receive a second location command on the screen at the processor;

determine a second pixel location in the image corresponding to the received second location command using a second set of depth values in the depth image;

create a second metric dot in the second pixel location in response to the second location command in the location of the second location command, the second metric dot having a position including depth corresponding to a second position in the scene;

determine a metric line by the processor between the first and the second pixel locations in the image;

complete a metric line in the scene between the first and the second metric dots;

receive a compute command from a user at the processor in response to the displayed metric line; and show a metric flag on the screen with a measurement of distance-in the scene of the metric line.

19. The device of claim 18, wherein the processor is further to, after creating the first metric dot, receive a user finger press on the metric dot and cancel or remove the metric dot from the screen in response to receiving the user finger press.

* * * * *